(12) United States Patent
Liu et al.

(10) Patent No.: US 12,368,351 B2
(45) Date of Patent: Jul. 22, 2025

(54) SHAFT VOLTAGE REDUCTION STRUCTURE APPLICABLE TO ELECTRIC MACHINE

(71) Applicant: ASIA VITAL COMPONENTS (CHINA) CO., LTD., Shenzhen (CN)

(72) Inventors: Feng Liu, Shenzhen (CN); Kun-Cheng Yang, Shenzhen (CN); Qian-Hong Lei, Shenzhen (CN)

(73) Assignee: ASIA VITAL COMPONENTS (CHINA) CO., LTD., Shenzhen (CN)

( * ) Notice: Subject to any disclaimer, the term of this patent is extended or adjusted under 35 U.S.C. 154(b) by 243 days.

(21) Appl. No.: 18/139,942

(22) Filed: Apr. 26, 2023

(65) Prior Publication Data

US 2024/0079936 A1 Mar. 7, 2024

(30) Foreign Application Priority Data

Aug. 25, 2022 (TW) .................................. 111132105

(51) Int. Cl.
*H02K 11/40* (2016.01)
*F16C 33/00* (2006.01)
(Continued)

(52) U.S. Cl.
CPC .............. *H02K 11/40* (2016.01); *F16C 33/00* (2013.01); *F16C 41/002* (2013.01);
(Continued)

(58) Field of Classification Search
CPC ...... H02K 11/40; H02K 5/1732; H02K 7/083; H02K 21/22; F16C 33/00; F16C 41/002; F16C 2380/26
See application file for complete search history.

(56) References Cited

U.S. PATENT DOCUMENTS

| 8,183,727 B2 * | 5/2012 | Fee ........................ H02K 11/40 310/90 |
| 2002/0043885 A1 * | 4/2002 | Asao ..................... F16C 35/067 310/90 |

(Continued)

FOREIGN PATENT DOCUMENTS

| CN | 113746275 A | 12/2021 |
| CN | 114337121 A | 4/2022 |

(Continued)

OTHER PUBLICATIONS

Search Report dated Dec. 27, 2022 issued by Taiwan Intellectual Property Office for counterpart application No. 111132105.

*Primary Examiner* — Terrance L Kenerly
(74) *Attorney, Agent, or Firm* — Bradley J. Thorson; DeWitt LLP

(57) ABSTRACT

A shaft voltage reduction structure is mounted on an electric machine having a bearing house and a rotor shaft rotatably connected together, and includes an electrically conductive main body, at least one electrically conductive bearing, and an electrically conductive shaft. The conductive main body is mounted to a bottom of the bearing house and includes a conductive shaft barrel projected from a center thereof. The conductive shaft barrel internally defines a shaft receiving hole, in which the conductive bearing is received. The conductive shaft includes a connecting end and a pivotal end connected to the rotor shaft and the shaft receiving hole, respectively. A shaft voltage across the rotor shaft of the electric machine is guided by the conductive shaft to release in a closed loop formed among the conductive main body, the conductive bearing and the bearing house, so as to reduce the shaft voltage of the electric machine.

9 Claims, 4 Drawing Sheets

(51) Int. Cl.
*F16C 41/00* (2006.01)
*H02K 5/173* (2006.01)
*H02K 7/08* (2006.01)
*H02K 21/22* (2006.01)

(52) U.S. Cl.
CPC .......... *H02K 5/1732* (2013.01); *H02K 7/083* (2013.01); *H02K 21/22* (2013.01); *F16C 2380/26* (2013.01)

(56) References Cited

U.S. PATENT DOCUMENTS

| | | | | |
|---|---|---|---|---|
| 2002/0061149 | A1* | 5/2002 | Shingai | H02K 7/085 384/490 |
| 2004/0182188 | A1* | 9/2004 | Nakamura | F16C 27/04 74/409 |
| 2007/0138748 | A1 | 6/2007 | Orlowski et al. | |

FOREIGN PATENT DOCUMENTS

| | | |
|---|---|---|
| CN | 216199921 U | 4/2022 |
| TW | M614379 U | 7/2021 |
| TW | M634687 U | 11/2022 |

* cited by examiner

SHAFT VOLTAGE REDUCTION STRUCTURE APPLICABLE TO ELECTRIC MACHINE

This application claims the priority benefit of Taiwan patent application number 111132105 filed on Aug. 25, 2022.

FIELD OF THE INVENTION

The present invention relates to a shaft voltage reduction structure, and more particularly, to a shaft voltage reduction structure applicable for electric machine.

BACKGROUND OF THE INVENTION

An electronically commutated (EC) fan is featured by good motor efficiency and energy saving, and it has gradually replaced the conventional direct current (DC) fan and alternating current (AC) fan to be applied in various kinds of electronic devices, such as servers, cabinets for computing centers, and communication devices.

Please refer to FIG. 1. A motor 11 of an EC fan 1 includes a stator 12, 1 rotor 13, and a bearing house 14. The stator 12 includes a silicon steel lamination stack 121 and windings 122 wound around the silicon steel lamination stack 121. The silicon steel lamination stack 121 is externally fitted around the bearing house 14, and the bearing house 14 internally defines a bearing hole 141 for receiving two rotor bearings 15 therein. The rotor bearings 15 can be, for example, ball bearings. The rotor 13 includes an impeller 131 having a plurality of blades 1311, and a rotor shaft 132 rotatably mounted in the bearing hole 141 of the bearing house 14. The impeller 131 covers the bearing house 14 with the blades 1311 located around an outer periphery of the bearing house 14. A magnet element 133 is provided on an inner side of the impeller 13 at a position corresponding to the silicon steel lamination stack 121. The bearing house 14 further has a circuit board 16 provided thereon, which includes an AC to DC converter 161 and a motor control circuit 162 electrically connected to the AC to DC converter 161 and the windings 122 of the stator 12. When the EC fan 1 is on, the AC to DC converter 161 converts an input AC voltage into a DC voltage and transmits the DC voltage to the windings 122 of the stator 12 of the motor 11, so that the motor control circuit 162 can control the impeller 131 to rotate.

A problem occurs when the conventional EC fan 1 is operating. That is, the sector-shaped stamped silicon steel laminations in the silicon steel lamination stack 121 of the stator 12 and grooves or holes formed on the laminations would cause unbalanced magnetic resistance in a magnetic circuit, and air gaps formed between the stator 12 and the rotor 13 are uneven. These factors result in unbalance in the magnetic field produced by the stator 12 of the motor 11. Under this situation, alternating flux around the rotor shaft 132 cuts the latter to result in induced voltage across the rotor shaft 132 (hereinafter referred to as the shaft voltage). When the shaft voltage is high enough to break down an oil film formed by a non-conductive lubricant in the rotor bearings 15, the rotor shaft 132 and the rotor bearings 15, which all are made of a metal material, will electrically contact with each other, and the shaft voltage would flow through a closed loop formed among the rotor shaft 132, the rotor bearings 15 and the bearing house 14, as indicated by the solid arrows in FIG. 1 (the solid arrows also represent shaft current 18 in the closed loop). The shaft current 18 produced under the effect of the shaft voltage flows from the rotor shaft 132 to the rotor bearings 15 to discharge and produce high temperature, which quickly degrades the property of the lubricant to result in heated and burned-out or seriously electrically corroded rotor bearings 15. For example, the surface metal of the rotor bearings 15 would melt to form tiny holes, such as corrosion pits, causing the problem of quickly reduced service life of the rotor bearings 15 and the motor 11. The shaft voltage will also occur on the EC fan 1 due to other causes. For instance, in the event the EC fan 1 is disposed in an environment surrounded by a lot of high-voltage devices, as a result of the high electric field, both ends of the rotor shaft 132 are subjected to electrostatic induction to produce shaft voltage and cause damage to the rotor bearings 15.

Currently, there are several ways adopted by the manufacturers to solve the problem of shaft voltage of the EC fan 1. In the first way, an insulating washer is added to an outer circumferential surface of each rotor bearing 15 to avoid the induced voltage at the two ends of the rotor shaft 132 and accordingly, open the loop circuit through which the shaft current 18 flows. A disadvantage of this first way is the insulating washers tend to have oil stains, become aged, and be worn out to lose their insulating ability. In the second way, an insulating oil film is applied to the rotor bearings 15. However, this will increase an overall cost of the fan 1. In the third way, an insulation treatment is performed on outer surface of the rotor shaft 132, such as forming a ceramic coating or a TA-C (tetrahedral amorphous carbon) nano material coating on the rotor shaft surface, or using a ceramic shaft. However, this skill is not mature for the present and will increase an overall cost of the fan 1. In the fourth way, the motor 11 is grounded using carbon brushes. However, the motor 11 has a very limited internal space for mounting the carbon brushes, and the carbon brushes are expensive and have shortened service life.

It is therefore an important issue to solve the above problems and disadvantages in the shaft voltage across the rotor shaft of the EC fan 1.

SUMMARY OF THE INVENTION

A primary object of the present invention is to provide a low cost shaft voltage reduction structure applicable to an electric machine to reduce a shaft voltage of the electric machine.

Another object of the present invention is to provide a shaft voltage reduction structure that can open a closed loop circuit of an induced voltage between two ends of a rotor shaft of an electric machine, so as to protect the rotor shaft of the electric machine against burned-out or electrical corrosion.

To achieve the above and other objects, the shaft voltage reduction structure applicable to electric machine according to the present invention is mounted on an electric machine. The electric machine has a bearing house and a rotor shaft pivotally connected to each other. The shaft voltage reduction structure includes an electrically conductive main body, at least one electrically conductive bearing, and an electrically conductive shaft. The main body is mounted to a bottom of the bearing house of the electric machine and includes an electrically conductive shaft barrel projected from a central area of the conductive main body. The conductive shaft barrel internally defines a shaft receiving hole, in which the conductive bearing is received. The conductive shaft has a connecting end and a pivotal end connected to the rotor shaft and the shaft receiving hole, respectively.

In the present invention, a shaft voltage across the rotor shaft of the electric machine is guided by the conductive shaft of the shaft voltage reduction structure to release in a closed loop formed among the conductive main body, the conductive bearing and the bearing house, so that the shaft voltage across the rotor shaft can be effectively reduced and the rotor shaft of the electric machine is protected against electrical corrosion.

BRIEF DESCRIPTION OF THE DRAWINGS

The structure and the technical means adopted by the present invention to achieve the above and other objects can be best understood by referring to the following detailed description of the preferred embodiment and the accompanying drawings, wherein.

DETAILED DESCRIPTION OF THE PREFERRED EMBODIMENTS

The present invention will now be described with a preferred embodiment thereof.

Figure 1:
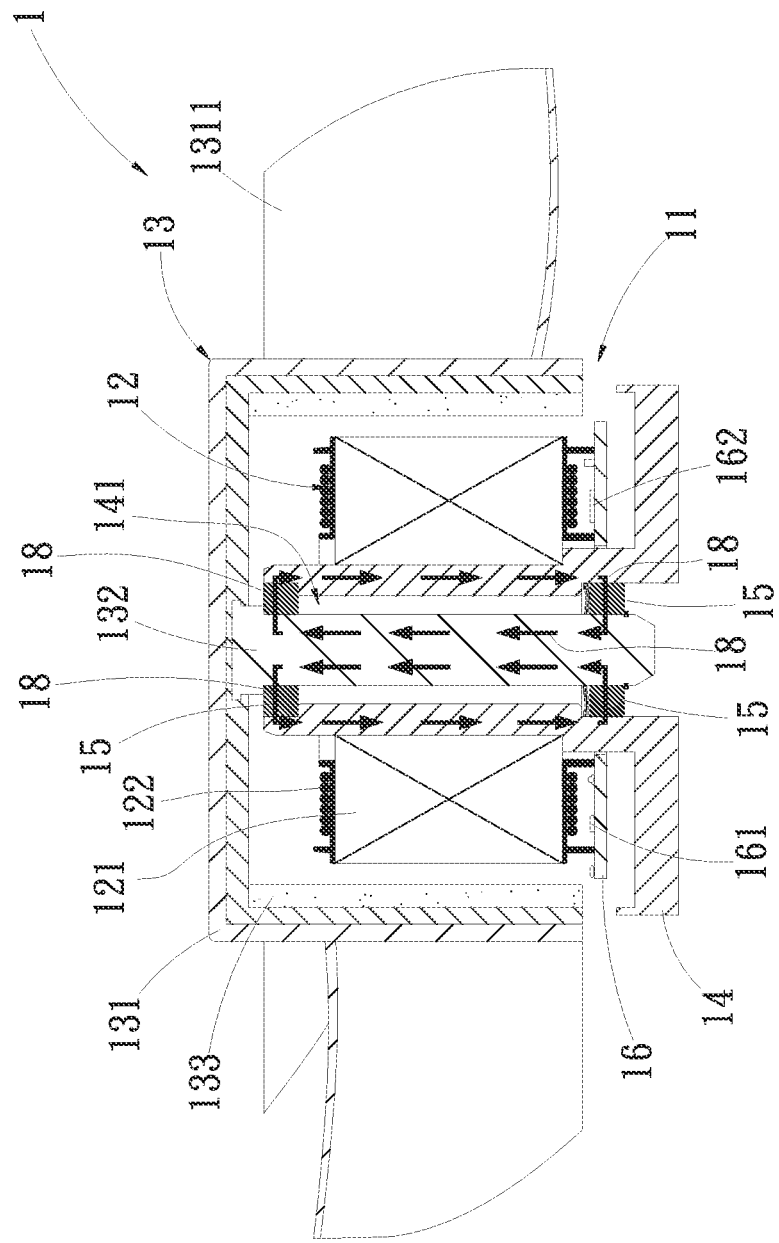
FIG. 1 is a sectional view of a conventional electric machine showing the path of a closed loop through which a shaft current of the conventional electric machine flows.
Figure 2:
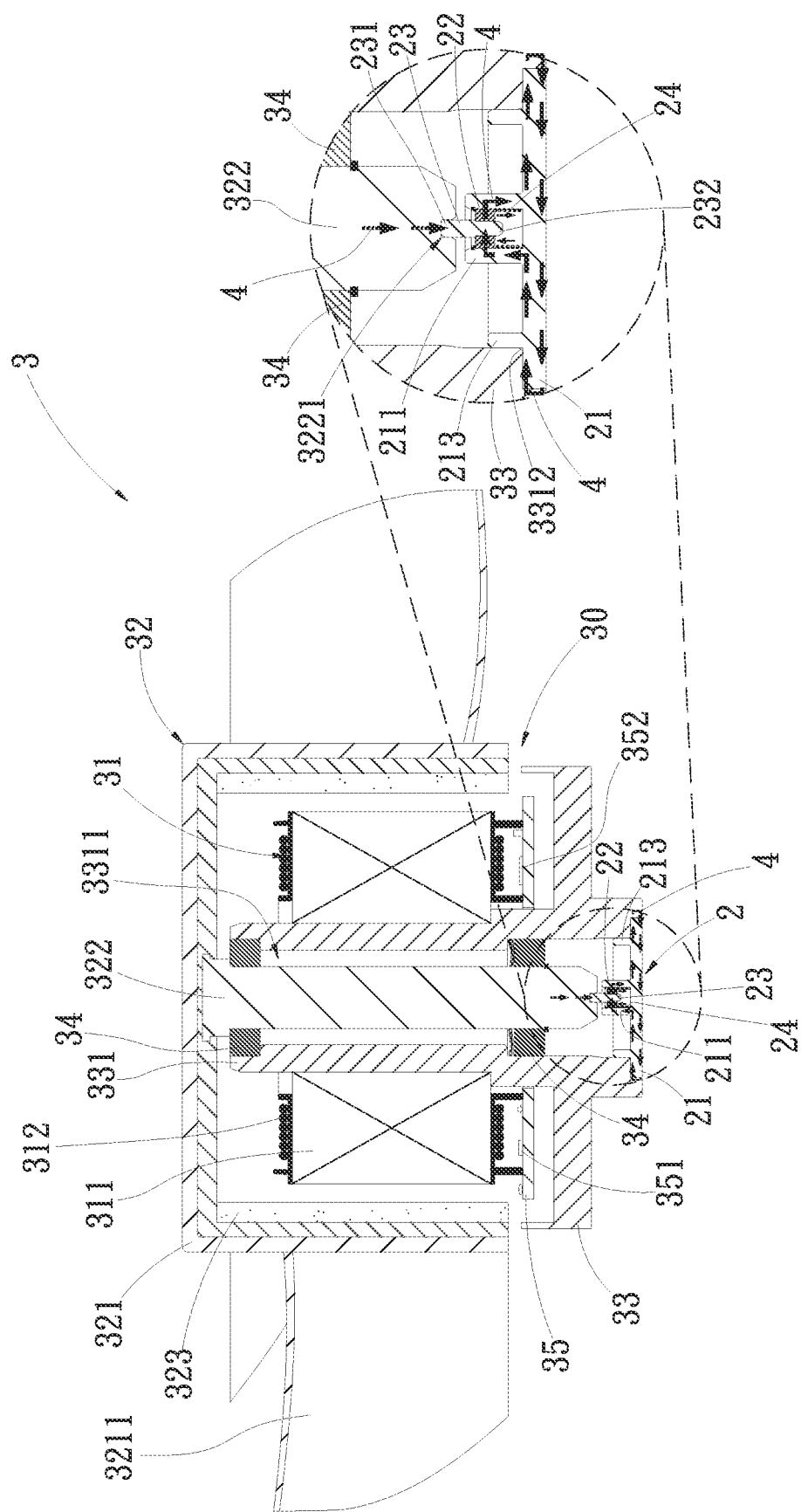
FIG. 2 is a sectional view of an electric machine, on which a shaft voltage reduction structure according to the present invention is mounted, showing the path of a closed loop through which a shaft current flows.

The present invention provides a shaft voltage reduction structure 2 applicable to an electric machine 30. As shown in FIG. 2, the shaft voltage reduction structure 2 is mounted on the electric machine 30, which is the motor of an electrically commutated (EC) fan 3 in the illustrated embodiment. However, it is understood the illustrated embodiment is non-restrictive. In practical implementation of the present invention, the electric machine 30 may be an electric motor 30, a generator 30, or other fan motor 30, such as alternating current (AC) fan motor or direct current (DC) fan motor. The electric machine 30 includes a stator 31, a rotor 32, and a bearing house 33. The bearing house 33 is made of a metal material, such as iron, stainless steel, or an alloy, and includes a shaft barrel 331, which is extended forward from a central area of the bearing house 33.

The shaft barrel 331 includes a bearing hole 3311 and a docking hole 3312 located at a bottom of the shaft barrel 331 corresponding to the bearing hole 3311. The bearing hole 3311 has at least one rotor bearing 34, such as a ball bearing or a self-oiling bearing, received therein. The bearing house 33 has a circuit board 35 provided thereon. On the circuit board 35, an AC to DC converter 351 and a motor control circuit 352 are provided. The AC to DC converter 351 converts an input AC power source into a DC current and transmits the DC current to a group of windings 312 of the stator 31. The motor control circuit 352 is electrically connected to the AC to DC converter 351 for controlling a rotational speed of the EC fan 3 and controlling other operations of the fan 3. The stator 31 includes a silicon steel lamination stack 311 externally fitted around the shaft barrel 331 of the bearing house 33. The group of windings 312 is wound around the silicon steel lamination stack 311 to electrically connect to the AC to DC converter 351 and the motor control circuit 352. The rotor 32 includes an impeller 321 having a plurality of blades 3211, and a rotor shaft 322 that has a first end rotatably received in the bearing house 33 via the at least one rotor bearing 34 and an opposite second end fixedly connected to a center of the impeller 321. The first end of the rotor shaft 322 is formed with a recess 3221 sunken into the first end. The impeller 321 covers and is located around an outer side of the stator 31 on the bearing house 33 and is internally provided with a magnetic element 323, such as a magnet, which is located corresponding to the silicon steel lamination stack 311 of the stator 31.

Figure 3:
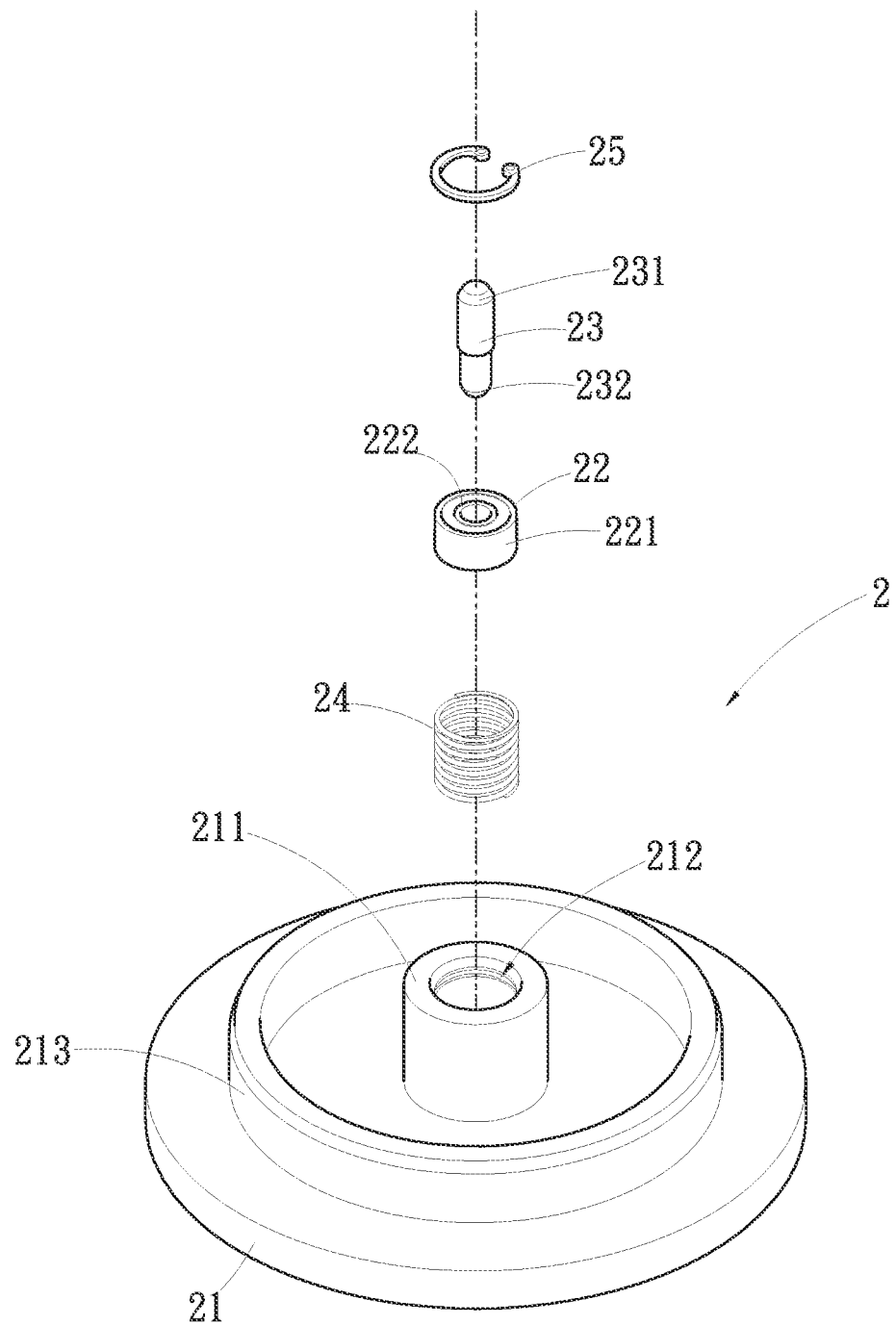
FIG. 3 is an exploded perspective view of the shaft voltage reduction structure according to an embodiment of the present invention.
Figure 4:
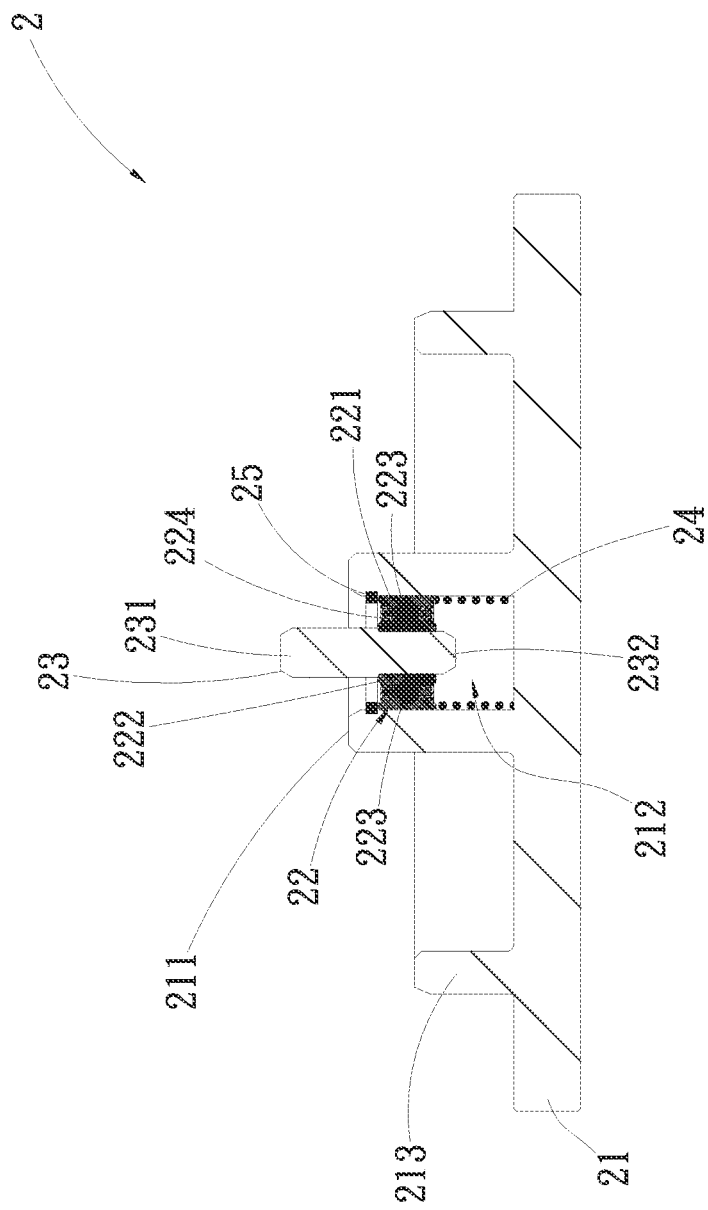
FIG. 4 is an assembled sectional view of the shaft voltage reduction structure of FIG. 3.

Please refer to FIGS. 3 and 4 along with FIG. 2. The shaft voltage reduction structure 2 includes an electrically conductive main body 21, an electrically conductive bearing 22, and an electrically conductive shaft 23. The conductive main body 21 is mounted to a bottom of the bearing house 33 of the electric machine 30, as shown in FIG. 2, and is in the form of a cap made of a metal material, such as iron, stainless steel, aluminum, or an alloy. The conductive main body 21 includes an electrically conductive shaft barrel 211, which is projected from a central area of the conductive main body 21 to internally define a shaft receiving hole 212, and a coupling section 213, which is axially projected from the conductive main body 21 and located between the conductive shaft barrel 211 and an outer periphery of the conductive main body 21. That is, the coupling section 213 is externally located around the conductive shaft barrel 211 to form a circumferentially continuous (or a non-continuous) and axially raised annular wall on the conductive main body 21. The coupling section 213 is configured to engage with the docking hole 3312, such that the coupling section 213 has an outer wall surface in contact with an inner wall surface of the shaft barrel 331.

The electrically conductive bearing 22 is disposed in the shaft receiving hole 212 of the conductive shaft barrel 211 and includes a conductive outer annular wall 221, a conductive inner annular wall 222, a plurality of rolling members 223, and an amount of conductive lubricant 224. The rolling members 223, such as balls, and the conductive lubricant 224 are sealed between the conductive outer annular wall 221 and the conductive inner annular wall 222. The conductive outer annular wall 221 is in contact with an inner wall surface of the shaft receiving hole 212. The conductive lubricant 224 may be conductive grease composed of an amount of base oil (such as synthetic base oil), an amount of conductive carbon-black thickener, and other additives (such as conductive agent), and having good electrical conductivity, high melting point, and long-acting lubricating effect. With the conductive lubricant 224, an electric conducting effect occurs between the conductive outer and inner annular walls 221, 222. In the illustrated embodiment, the conductive bearing 22 is a ball bearing with conductive lubricant 224. However, the present invention is not necessarily limited thereto. In another operable embodiment, the conductive bearing 22 can be a self-oiling bearing with conductive lubricant 224.

Please refer to FIGS. 2 to 4. The conductive shaft 23 includes two opposite ends, one of which is a connecting end 231 and another one of which is a pivotal end 232. The connecting end 231 of the conductive shaft 23 is connected to the recess 3221 formed at the first end of the rotor shaft 322 of the electric machine 30, as can be seen in FIG. 2, and the pivotal end 232 of the conductive shaft 23 is pivotally connected to the conductive inner annular wall 222 of the conductive bearing 22, as can be seen in FIG. 4, such that the pivotal end 232 of the conductive shaft 23 is in electrical contact with the conductive bearing 22. That is, they are electrically connected to each other. More specifically, the conductive shaft 23 is pivotally connected to the shaft receiving hole 212 of the conductive shaft barrel 211 via the conductive bearing 22. With this arrangement, the conductive main body 21, the conductive shaft 23, the conductive bearing 22, and the bearing house 33 of the electric machine 30 are in electrical contact with one another to form a closed loop, as indicated by the solid arrows in FIG. 2. Being guided by the conductive shaft 23, a shaft voltage (which is an induced voltage) on the rotor shaft 322 of the electric machine 30 flows through the closed loop and released to thereby effectively reduce the shaft voltage across the rotor shaft 322.

More specifically, an amount of shaft current 4 produced under the effect of the shaft voltage (see the dotted arrows in FIG. 2, which indicate the shaft current 4 on the rotor shaft 322) flows from the rotor shaft 322 along a path toward locations having relatively lower impedance. The path is the closed loop among the conductive shaft 23, the conductive bearing 22, the conductive main body 21 and the bearing house 33, as indicated by the solid arrows in FIG. 2, which also represent the shaft current 4 in the closed loop. The shaft current 4 is consumed when it flows through the conductive main body 21 and the bearing house 33 that are in the closed loop and act like electrical resistance. Further, since the path between the rotor shaft 322 and the rotor bearing 34 has impedance higher than that of the path between the rotor shaft 322 and the conductive shaft 23, and the shaft voltage (i.e. the shaft current 4) would flow toward the path having lower impedance, the shaft voltage on the rotor shaft 322 would flow toward the conductive shaft 23, just like it is released from the shaft voltage reduction structure 2. The reduced shaft voltage on the rotor shaft 322 is not high enough to break down or penetrate an oil film of the lubricant in the rotor bearing 34, so that there is not electrical connection between the rotor shaft 322 and the rotor bearing 34 to thereby effectively block the shaft current 4 from flowing through the rotor bearing 34 and accordingly, protect the rotor bearing 34 against electrical corrosion.

Please refer to FIGS. 2 and 4. To prevent the conductive bearing 22 from vibrating and to more quickly guide the shaft current 4 to the conductive main body 21, the shaft voltage reduction structure 2 may further include a conductive elastic element 24, such as a wave spring. The conductive elastic element 24 is disposed between the conductive bearing 22 and an inner bottom of the conductive shaft barrel 211 with an upper and a lower end of the conductive elastic element 24 contacting with and connected to a lower side of the conductive bearing 22 and the inner bottom of the conductive shaft barrel 211, respectively, so as to provide the path for the shaft current 4 to flow to the conductive main body 21 and the conductive shaft barrel 211. The conductive elastic element 24 also preloads the conductive bearing 22 in the conductive shaft barrel 211.

Further, to prevent the conductive bearing 22 from rotating along with the conductive shaft 23 in the conductive shaft barrel 211 and from dislocating upward to be thrown out of the conductive shaft barrel 211, a fastening element 25, such as a C-ring, is provided for retaining around an outer side of the conductive shaft 23 at a location adjacent to an upper end of the conductive bearing 22, so as to restrict the conductive bearing 22 from moving upward.

Therefore, in the present invention, the shaft voltage across the rotor shaft 322 of the electric machine 30 is guided by the conductive shaft 23 to release in the closed loop. In this way, at least 85% or more of the shaft voltage across the rotor shaft 322 can be effectively reduced. This not only prevents the rotor shaft 322 from being burned out by the high shaft voltage, but also avoids the shaft voltage from discharging to the rotor bearing 34. Further, with the shaft voltage reduction structure 2 of the present invention, the rotor bearing 34 is protected against electrical corrosion caused by the shaft current 4 and can therefore have extended service life. Since the shaft voltage reduction structure 2 can be assembled or disassembled conveniently for use with electric machines 30 having different internal spaces, it has the advantage of being mounted easily and conveniently. The shaft voltage reduction structure 2 also has the advantage of reduced cost because its cost is at least 60% lower than that of the conventional ways of reducing shaft voltage.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A shaft voltage reduction structure applicable to an electric machine having a bearing house and a rotor shaft rotatably supported within the bearing house, comprising:
   an independent conductive body externally mounted at a bottom of the bearing house, the conductive body including a conductive shaft sleeve protruding from a central region thereof, the conductive shaft sleeve defining a shaft receiving bore distinct from the rotor shaft;
   at least one electrically conductive bearing being disposed in the shaft receiving bore, the conductive bearing incorporating conductive lubricant to facilitate voltage guiding; and
   an electrically conductive shaft having a connecting end and a pivotal end connected to the rotor shaft and the shaft receiving bore, respectively; and the conductive shaft rotating with the rotor shaft and actively guiding shaft voltage from the rotor shaft to the conductive bearing, wherein the conductive body, the conductive bearing, and the conductive shaft form an external closed circuit configured to release shaft voltage and protect a rotor bearing from electrical corrosion.

2. The shaft voltage reduction structure applicable to electric machine as claimed in claim 1, wherein the conductive main body includes a coupling section axially projected therefrom to be located between the conductive shaft barrel and an outer periphery of the conductive main body.

3. The shaft voltage reduction structure applicable to electric machine as claimed in claim 1, wherein the conductive bearing is a ball bearing with electrically conductive lubricant.

4. The shaft voltage reduction structure applicable to electric machine as claimed in claim 1, wherein the conductive bearing includes an electrically conductive outer annular wall, an electrically conductive inner annular wall, a plurality of rolling members, and an amount of electrically conductive lubricant; the rolling members and the conductive lubricant being sealed between the conductive outer and inner annular walls; and the conductive outer annular wall being in contact with an inner wall surface of the shaft receiving hole of the conductive shaft barrel.

5. The shaft voltage reduction structure applicable to electric machine as claimed in claim 1, further comprising an electrically conductive elastic element, which is disposed between the conductive bearing and an inner bottom of the conductive shaft barrel.

6. The shaft voltage reduction structure applicable to electric machine as claimed in claim 2, wherein the bearing house of the electric machine includes a shaft barrel extended forward from a central area of the bearing house; the shaft barrel including a bearing hole and a docking hole located at a bottom of the shaft barrel corresponding to the bearing hole; the bearing hole having at least one rotor bearing received therein, and the at least one rotor bearing being pivotally connected to one of two end of the rotor shaft; and the docking hole being connected to the coupling section of the conductive main body.

7. The shaft voltage reduction structure applicable to electric machine as claimed in claim 6, wherein the rotor shaft is provided at an end with a recess sunken thereinto for connecting with the connecting end of the conductive shaft.

8. The shaft voltage reduction structure applicable to electric machine as claimed in claim 1, wherein the electric machine is a fan motor.

9. The shaft voltage reduction structure applicable to electric machine as claimed in claim 1, wherein the conductive main body and the bearing house are made of a metal material.

* * * * *